March 14, 1967 R. T. BUTLER 3,309,133
SLIDING TAIL GATE

Filed Sept. 8, 1964 3 Sheets-Sheet 1

ROY T. BUTLER
INVENTOR

BY John R. Faulkner
John J. Roethel
ATTORNEYS

March 14, 1967  R. T. BUTLER  3,309,133
SLIDING TAIL GATE

Filed Sept. 8, 1964  3 Sheets-Sheet 3

ROY T. BUTLER
INVENTOR
BY *John L. Faulkner*
*John J. Soethel*
ATTORNEYS

United States Patent Office 3,309,133
Patented Mar. 14, 1967

3,309,133
SLIDING TAIL GATE
Roy T. Butler, Dearborn, Mich., assignor to Ford Motor Company, Dearborn, Mich., a corporation of Delaware
Filed Sept. 8, 1964, Ser. No. 394,888
4 Claims. (Cl. 296—51)

This invention relates to vehicle body closures and particularly to tail gates for combined passenger and cargo carrying vehicles popularly known as "station wagons."

Tail gates providing access to the rearwardly facing third seats or the cargo carrying area of station wagons are conventionally hinged at their lower edge for swinging movement about a horizontal hinge axis to provide for movement from a closed to an opened position. This conventional arrangement has certain inherent disadvantages. When egress or ingress to the third seat area is desired, the horizontally extending tail gate presents a high step affecting the ease of entry or exit from the third seat area. When loading or unloading cargo from the rear of the station wagon, the horizontal tail gate projects rearwardly to such an extent as to make it difficult to reach any packages which may be on the cargo carrying floor to the immediate rear of the front seats of the vehicle body.

It is an object of the present invention to provide a closure for a vehicle body opening, particularly a tail gate for the rear opening in a station wagon body, which may be operated in a conventional manner or which alternatively may be operated as a closure movable laterally of the opening. When moved laterally of the opening, the closure provides a vertical door-like opening giving unobstructed access to the rearwardly facing third seats or to the cargo carrying area. This is accomplished by mounting the closure on a support means which is constructed and arranged to hinge the closure to the vehicle body for swinging movement about a horizontal hinge axis. The support means permits the closure to be swung from a substantially upright closed position through an intermediate inclined position to a substantially horizontal open position. The construction and arrangement further includes guide means on the support means further supporting the closure when in said intermediate inclined position or therebeyond for movement laterally of the opening in the vehicle body in a direction substantially parallel to the hinge axis. In the case of a tail gate, this means that the tail gate may be shifted laterally of the body opening so that direct access to the rearwardly facing third seat or to the cargo carrying area may be obtained without interference from the tail gate.

These and other objects, advantages and features of the invention will become more fully apparent as references had to the following specification and drawings wherein.

Figure 1:
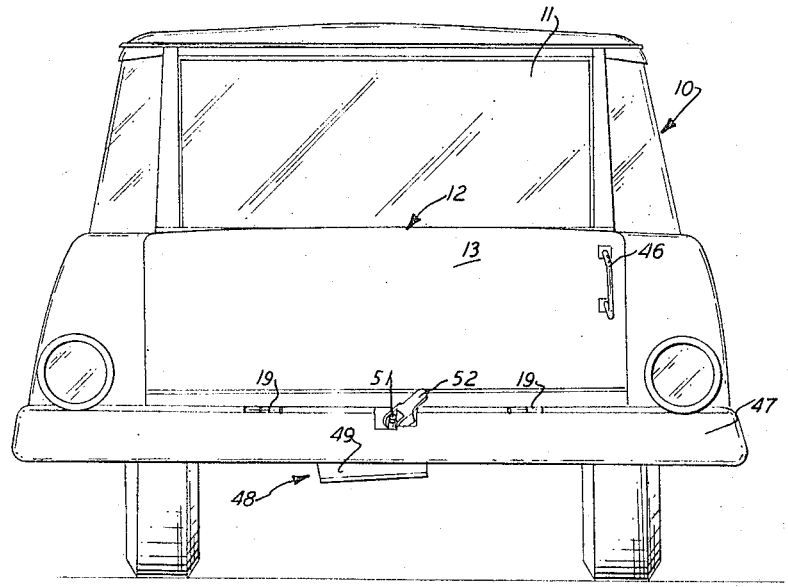
FIG. 1 is a rear elevation of a station wagon illustrating the tail gate in a closed position.
Figure 2:
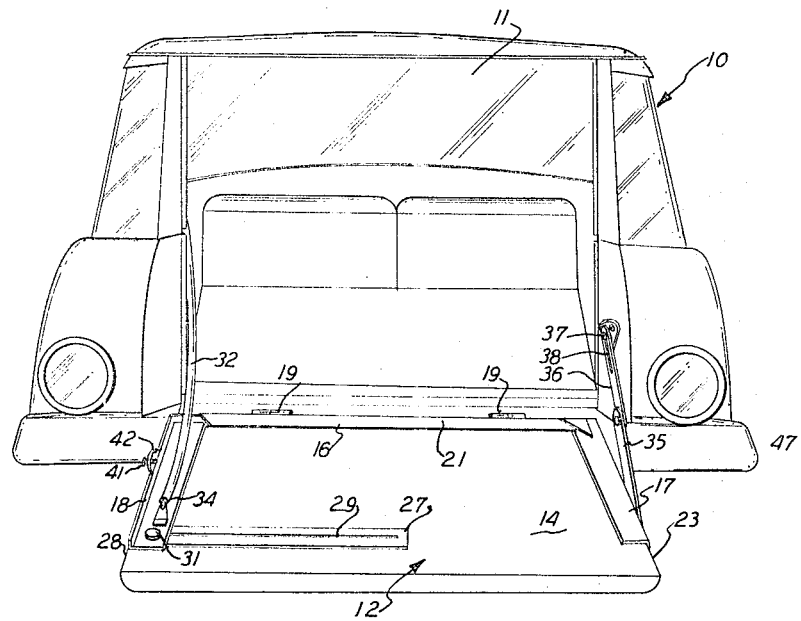
FIG. 2 is a rear elevation illustrating the tail gate swung to a fully opened horizontal position.
Figure 6:
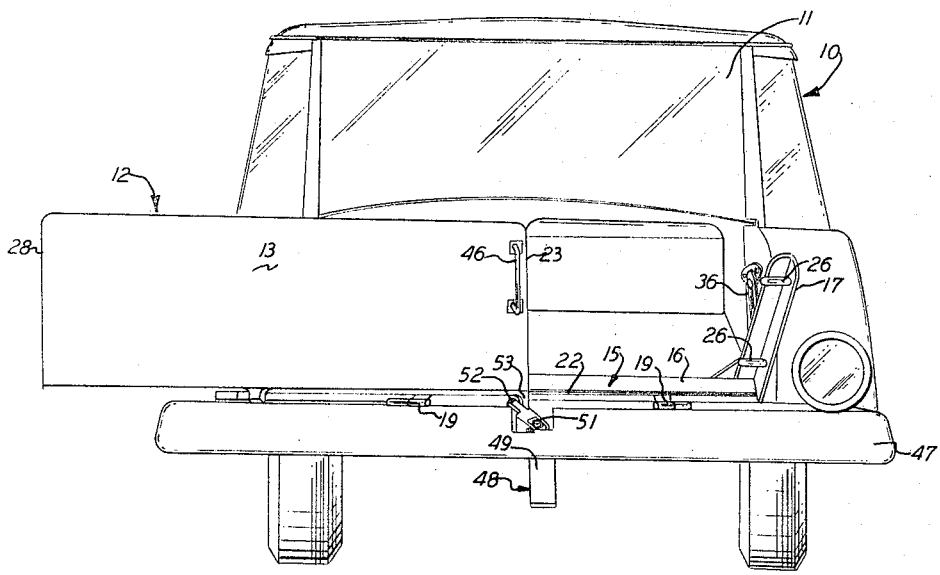
FIG. 6 is a rear elevation further illustrating the appearance of the tail gate in its FIG. 4 position.

Referring now to the drawings and particularly to FIGS. 1, 2 and 6, there is illustrated the rear body portion 10 of a combination passenger carrying and cargo carrying vehicle or station wagon. At its rear end, the rear body portion 10 is provided with a large substantially rectangular opening 11.

In a conventional station wagon, the rectangular opening 11 is closed by a door or tail gate supported at its lower horizontal edge for swinging movement from a substantially upright closed position to a substantially horizontal open position. This door or tail gate comprises spaced outer and inner panels providing a shell that houses the operating mechanism for the latch devices adapted in closed position to secure the tail gate of the vehicle body. This shell also provides a well into which the rear window may be retracted and also provides a housing for the mechanism for raising and lowering the rear window.

The tail gate, generally designated 12, embodying the present invention also comprises an outer panel 13 and an inner panel 14 providing a door structure or shell adapted to house conventional latch mechanisms, window regulator mechanisms and rear window supporting and guiding means. The tail gate 12, however, differs from a conventional tail gate in that it is not directly hinged to the vehicle body but is carried in a frame, generally designated 15. The frame 15 comprises an elongated member 16 which extends horizontally across the lower edge of the body opening 11. At one end of the member 16 has a channel section 17 welded thereto, the channel section extending upwardly when the tail gate is in a closed position. At its other end the member 16 has rigidly connected thereto an upstanding flat elongated member or strap 18. Both the channel section 17 and the strap 18 are somewhat shorter in vertical length than the vertical height of the tail gate. The frame 15 is hingedly mounted on a vehicle body by conventional hinge devices 19 which provide a horizontal hinge axis about which the frame member may be swung from a closed to a substantially horizontal open position.

Figure 3:
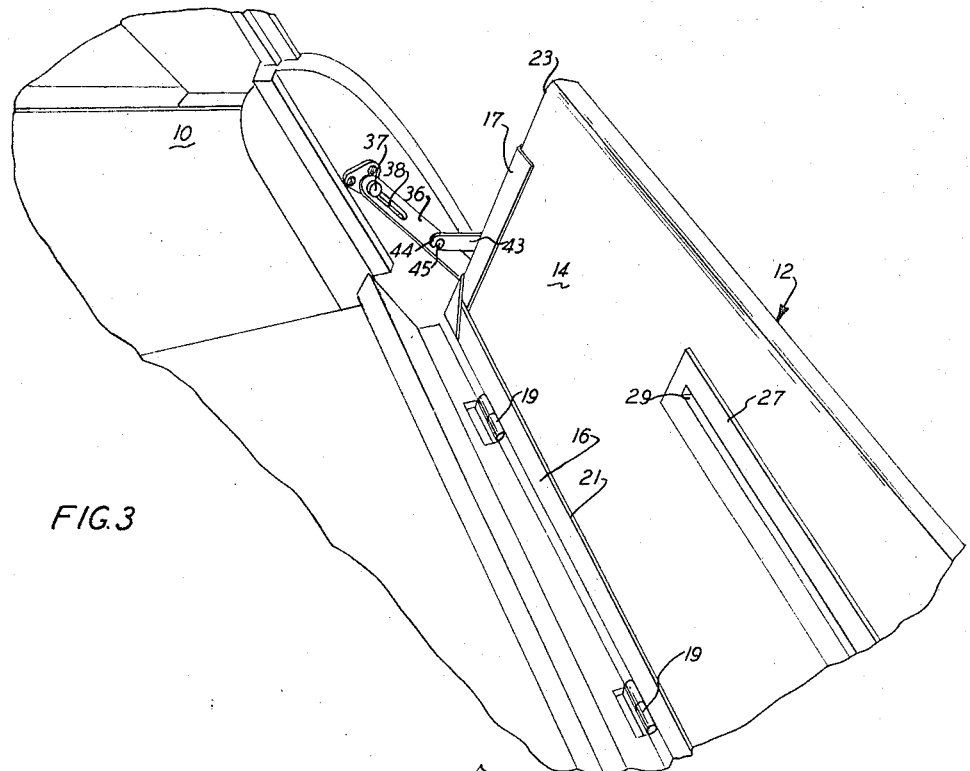
FIG. 3 is a fragmentary perspective view illustrating the tail gate swung to an inclined position in which it is only partially opened.

At its lower edge 21 the tail gate 12 is interlocked with a flange 22 or the like on the elongated member 16. The construction and arrangement is such that the elongated member 16 provides a track on which the tail gate 12 is slidable in a direction longitudinally of the elongated member 16. This is a direction parallel to the horizontal hinge axis about which the frame 15 is swingable. On its vertical edge 23 the tail gate is reinforced by a channel section 24 having upper and lower pin receiving apertures 25. The pin receiving apertures receive pins 26 which extend inwardly from the channel section 17 in a direction substantially parallel to the horizontal hinge axis defined by the hinge devices 19. When the tail gate 12 is in the position shown in FIGS. 1, 2 or 3, the pins 26 project into the pin receiving apertures 25 and thus couple the tail gate to the upstanding member 17 of the frame 15.

Figure 4:
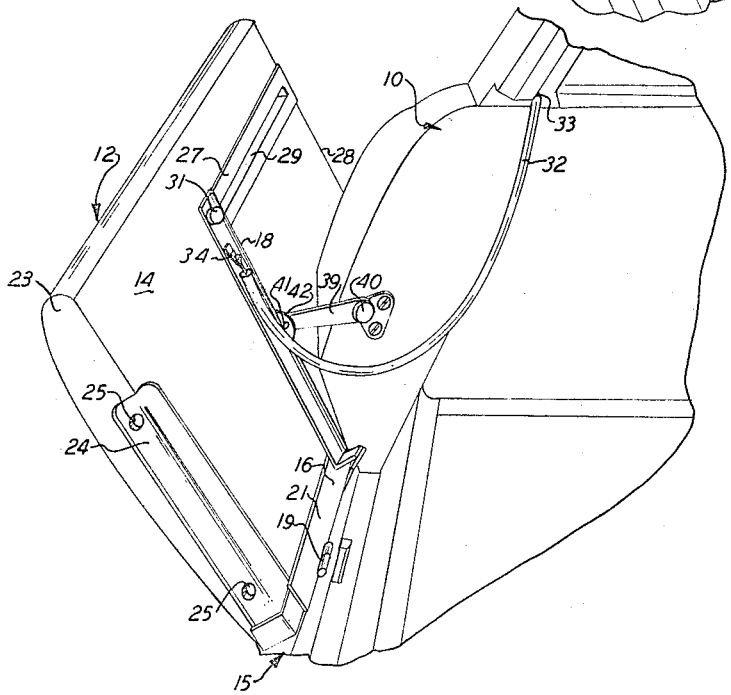
FIG. 4 is a fragmentary perspective view illustrating the tail gate moved laterally of the body opening from its FIG. 3 position.

The strap 18 of the frame 15 also is coupled to the inner panel 14 of the tail gate 12. As best seen in FIG. 4, an elongated, horizontally extending, reinforcing plate 27 is secured to the inner panel 14. The reinforcing member 27 extends from the vertical edge 28 of the tail gate to a point substantially at the center of the latter. The reinforcing member is provided with a horizontally extending slot 29 through which a stud 31 carried on the upper end of the strap 18 projects. The construction and arrangement is such the stud 31 cannot be withdrawn from the slot 29 so that the tail gate when disengaged from the frame member 17 remains coupled to and is supported by the frame member through its strap 18.

Provision is made for supporting the frame member 15 and thereby the tail gate 12 in a partially opened position and in a fully opened position. For example, a flexible strap 32 having one end 33 anchored to the vehicle body at the side of the rectangular opening 11 and its other end 34 anchored to the strap 18 just below the stud 31 functions to resist any loads which may force the tail gate beyond its normal horizontal loading position. The frame channel section 17 is also coupled to the vehicle body through a load resisting or folding link device comprising a pair of links 35 and 36 pivotally coupled to each other and pivotally supported at their ends on suitable pivot studs, as indicated at 37 and best seen in FIG. 5. The link 36 is provided with a slot 38 providing for a lost motion connection between the link 36 and the pivot stud 37 to accommodate folding movement of the links as the frame member is swung to a fully closed position.

The frame member 15, and thereby the tail gate 12, is supported in the intermediate open position by simple latch devices. As seen in FIG. 4, a latch element 39 is pivotally mounted at 40 on the vehicle body and has a hook (not visible) at its free end adapted to engage a pin 41 attached to a flange 42 on the strap 18.

Figure 5:
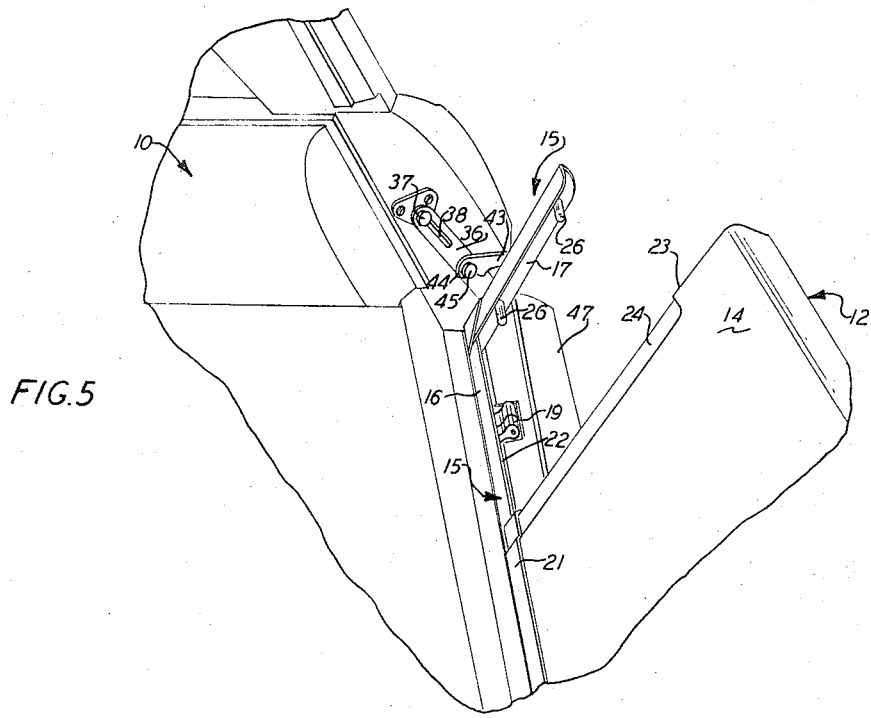
FIG. 5 is a fragmentary perspective view illustrating the side of the vehicle opposite that visible in FIG. 4 as it appears after the tail gate has been moved laterally of the body opening.

As seen in FIG. 5, a latch element 43 is pivotally secured to the channel section 17 and has a hook end 44 adapted to hook over a pin 45 carried on the link 36 of the foldable link device provided to support the frame when the frame is in a horizontal position.

The operation of the tail gate construction and arrangement embodying the present invention may be described as follows:

To provide a vertical opening for access to the interior of the vehicle, a conventional tail gate latch mechanism (not forming a part of the present invention) is released and the handle 46 on the exterior of the tail gate 12 is grasped to pull the tail gate away from the vehicle body about its horizontal axis formed by the hinge devices 19. The tail gate 12 is pulled outwardly to an intermediate inclined position, as seen in any one of FIGS. 3, 4 or 5, as determined by the latch elements 39 and 43. Next the handle 46 is pulled toward the left side of the vehicle body as seen in FIG. 1 causing the tail gate 12 to slide laterally of the body opening 11 or in a direction parallel to the horizontal hinge axis. The tail gate is supported for this sliding movement by the stud 31 on the end of the strap 18 which travels in the slot 29 on the panel reinforcing member 27. The tail gate may be moved laterally a distance approximately one-half of its width. The angle of inclination of the tail gate in this intermediately inclined position is a matter of choice. It is, of course, related to the contour of the rear end of the vehicle body since the tail gate must have clearance with respect to the vehicle tail lights or other appendages at the rear of the rear quarter panels or fenders.

When it is desired only to swing the tail gate from a substantially upwardly extending opened poistion to a substantially horizontal opened position as seen in FIG. 2, the movement of the tail gate from its upwardly extending position to the intermediate inclined position will occur first. It is then necessary to release the latch devices 39 and 43, and the tail gate may then be moved to a horizontal position in a conventional manner.

The construction and arrangement of the tail gate for sliding movement horizontally of the hinge axis permits the incorporation of an auxiliary step beneath the rear bumper 47 on the vehicle body. This step is used to assist in entry to the rear seating area of the vehicle.

The step mechanism, generally designated 48, comprises a step 49 carried on the lower end of a shaft 51 which has at its upper end an arm 52. At its lower edge, at a point substantially below the handle 46 shown in the drawing, the tail gate is provided with a stop or an abutment 53. At the end of its range of movement laterally, the tail gate stop or abutment 53 engages the arm 52 of the step mechanism 48 causing the step to be swung outwardly in the direction substantially normal to the rear bumper 47 of the vehicle body. The tail gate may be provided with a second abutment adapted to engage the arm 52 to retract the step when the tail gate has been moved back to its closed position, or the step mechanism may be spring loaded for restoration upon removal of the abutment 53 holding it in extended position.

It will be understood that the invention is not to be limited to the exact construction shown and described, but that various changes and modifications may be made without departing from the spirit and scope of the invention as defined in the appended claims.

I claim:

1. In a vehicle body of the station wagon type having a cargo carrying area and a frame structure in one wall providing an access opening to said cargo carrying area,
   a tail gate forming closure for said opening,
   frame means hinging said tail gate to said body for swinging movement about a horizontal hinge axis,
   said closure being swingable from a substantially upright closed position in which said tail gate is seated in said frame structure through an intermediate inclined position in which said tail gate is clear of interference with said frame structure to a substantially horizontal open position in which said tail gate forms an extension of said cargo carrying area,
   and coacting track and follower means on said frame means and said tail gate guiding the latter when in said intermediate inclined position or therebeyond for movement laterally of said opening in a direction to provide access to said cargo carrying area between one end of said tail gate and the adjacent edge of said frame structure.

2. In a vehicle body having in one wall thereof a frame structure providing an access opening therein,
   a door for said opening,
   a support frame for said door,
   hinge means hinging said support frame on said vehicle body frame structure for swinging movement about a horizontal hinge axis,
   said door with its support frame being swingable from a substantially upright position in which the door is seated within said vehicle body frame structure to close said opening through an intermediate inclined position in which said door is clear of interference with said vehicle body frame structure to a substantially horizontally open position,
   disconnectable means for holding said door through its support frame in said intermediate inclined position,
   and coacting guide means on said support frame and said door guiding said door when held in said intermediate inclined position for movement laterally independently of said support frame to provide partial access to the interior of said vehicle body through said opening.

3. In a vehicle body having a frame structure providing in a substantially vertical wall of said body an access opening,
   a door for said opening,
   a support frame for said door,
   hinge means hinging said support frame on said vehicle body opening forming frame structure for swinging movement about a horizontal hinge axis,
   said support frame comprising a horizontal track member and vertically upstanding members at each end thereof,
   coacting means on at least one of said upstanding members holding said door against swinging movement independently of said support frame about said horizontal axis,
   said door with its support frame being swingable from a substantially upright closed position in which said door is seated within said vehicle body frame structure through an intermediate inclined position in which said door is clear of interference with said vehicle body frame structure to a substantially horizontal open position to form a load receiving platform, disconnectable means for holding said door through its support frame in said intermediate inclined position, and coacting guide means on said door and said support frame guiding the door when held in said intermediate inclined position for movement on said track means independently of said support frame laterally of the latter and said opening in a direction substantially parallel to said hinge axis.

4. In a vehicle body according to claim 3, a step, means pivotally supporting said step for swinging movement from a position substantially beneath said door to a position outwardly of said vehicle body, and coacting means on said door and step supporting means operative to move said step to said outward position upon movement of the door laterally of said opening.

References Cited by the Examiner
UNITED STATES PATENTS

| | | | |
|---|---|---|---|
| 1,728,539 | 9/1929 | Geschickter | 160—358 |
| 3,010,760 | 11/1961 | Trautmann | 296—57 |
| 3,143,196 | 8/1964 | Gutowski et al. | 49—222 |

BENJAMIN HERSH, *Primary Examiner.*

J. H. BRANNEN, *Assistant Examiner.*